May 10, 1932.  H. F. YORK  1,857,907
CORN PICKING AND HUSKING MACHINE
Filed July 8, 1930  4 Sheets-Sheet 1

Inventor
Henry F. York
By
Attorney

May 10, 1932. H. F. YORK 1,857,907
CORN PICKING AND HUSKING MACHINE
Filed July 8, 1930 4 Sheets-Sheet 2
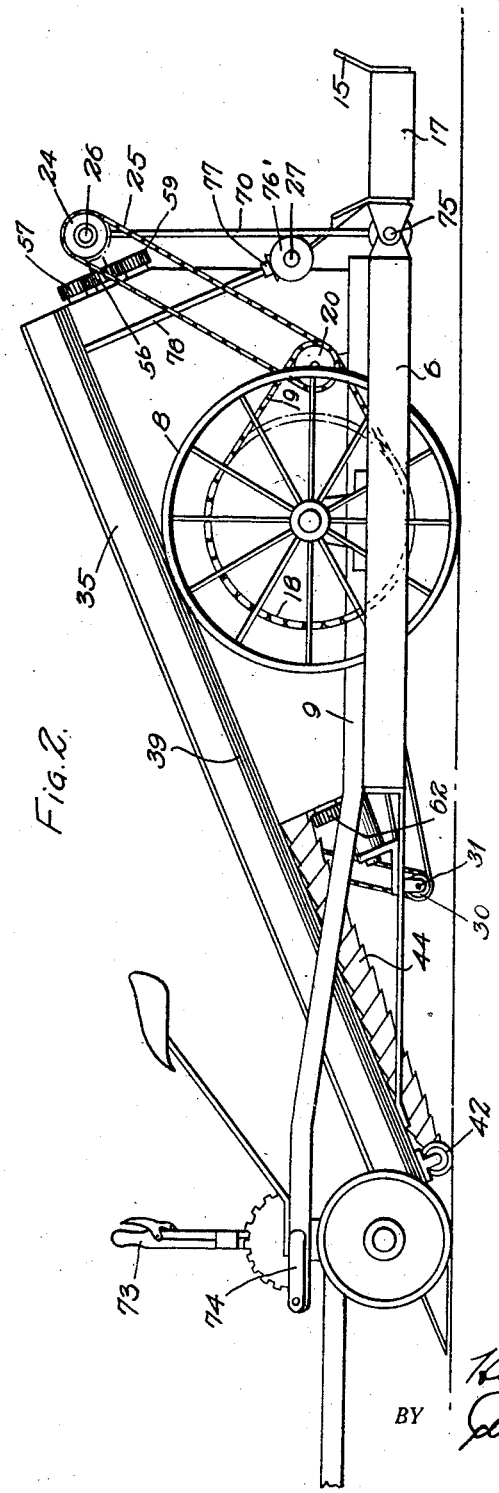

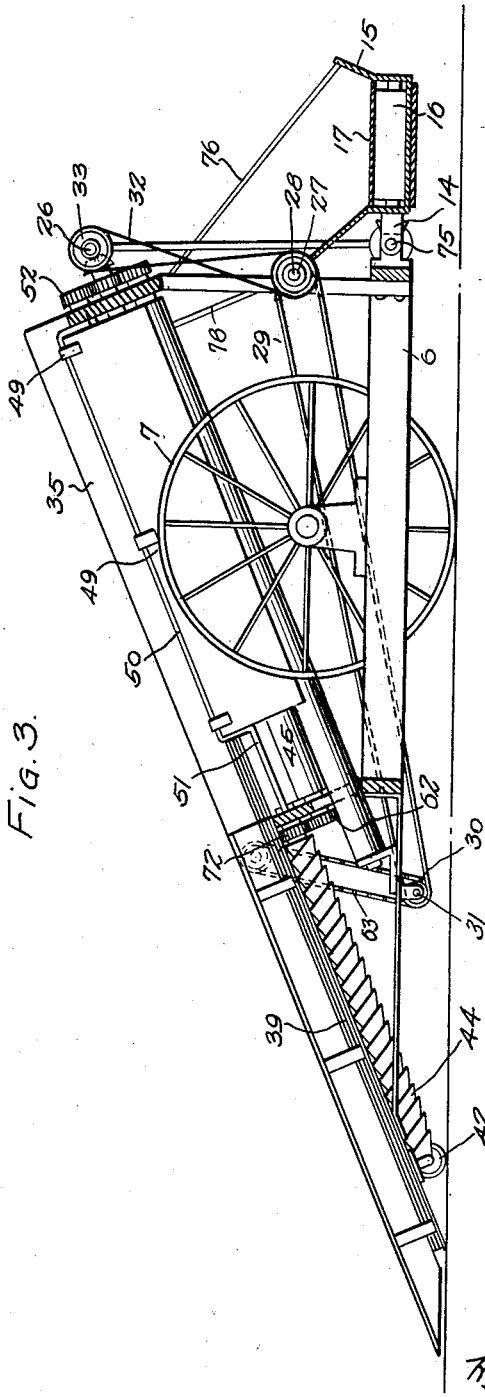

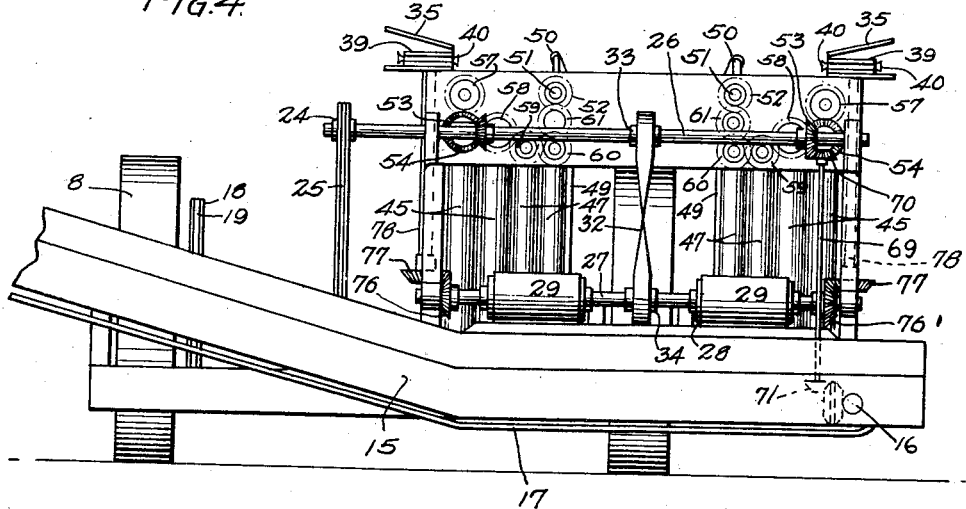

Patented May 10, 1932

1,857,907

UNITED STATES PATENT OFFICE

HENRY F. YORK, OF HAXTUM, COLORADO

CORN PICKING AND HUSKING MACHINE

Application filed July 8, 1930. Serial No. 466,538.

The primary object of my invention is to provide a machine that will pick the ears of corn off from the stalk, and husk the ears and deliver the husked ears to a place of deposit.
Another object of my invention is to provide a machine of this character that will raise fallen corn stalks and pick the ears from such stalks and finally husk the ears.
Another object of my invention is to provide a machine of this class which will pick the ears of corn from two rows simultaneously; and with these and other objects in view my invention consists of the parts and combination of parts as will be hereinafter fully pointed out.

In the drawings:

Figure 2 is a side elevation of Figure 1.

Figure 3 is a central vertical longitudinal sectional view of the machine.

Figure 4 is a rear elevation of the machine.

Figure 5 is a diagrammatic view showing assembly of augers, snapping rolls, husking rolls, husker and conveyor belt.

Figure 1:
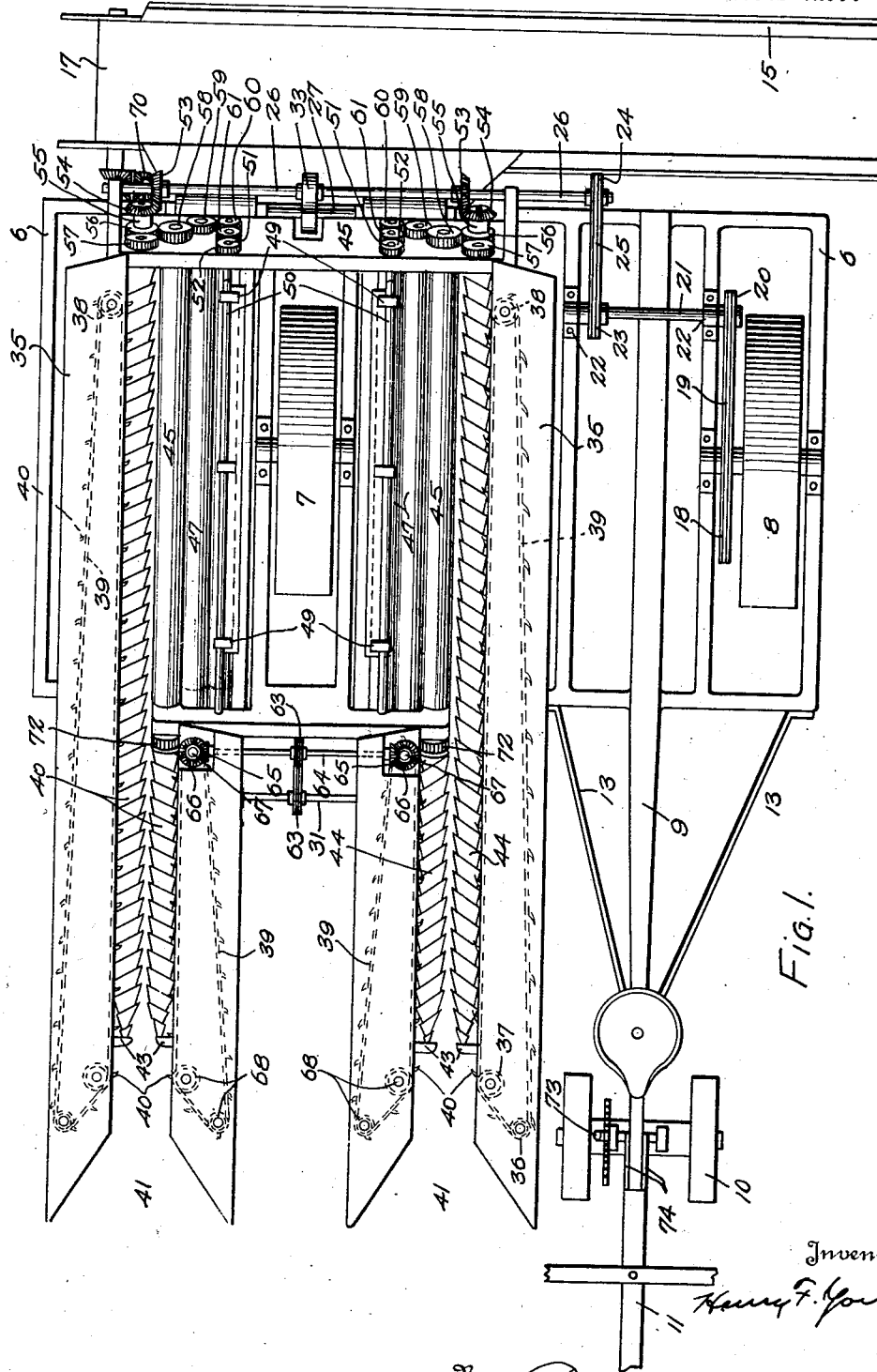
Figure 1 is a top plan view of a corn picking and husking machine embodying my invention.

The reference numeral 6 designates the frame of the machine which is supported on the traction wheels 7, 8. To one side of the frame a beam 9 extends forwardly and carries the wheels 10, the operator's seat 11, and the hitch pole 12 to which a team of horses may be hitched, suitable braces 13 extending from the frame 6 to the forward end of the beam 9. A bracket 14 extends from the rear of the machine which supports a trough 15 in which pulleys 16 are journalled on which is mounted an endless belt conveyor 17 which conveys the husked ears of corn to a wagon or other place of deposit. The traction wheel 8 is provided with a sprocket wheel 18, on which is mounted the sprocket chain 19 which in turn engages the toothed wheel 20 mounted on the shaft 21, said shaft being journalled in bearings 22 on the frame 6. This shaft 21 is also provided with a toothed wheel 23 in line with a toothed wheel 24, a drive chain 25 connecting the two wheels 23, 24, said wheel 24 being keyed to the shaft 26.

The shaft 27 is journalled on the frame 6 (see Figure 4) and has keyed thereto two belt pulleys 28 on which the conveyor belts 29 are mounted, the other ends of the belts 29 being mounted on pulleys 30 keyed to the shaft 31 journaled in the frame of the machine; these belts 29 receive the shucked ears of corn and convey them to the trough 15 at the rear of the machine. A belt 32 extending from the pulley 33 on the shaft 26 to the pulley 34 on the shaft 27 conveys power from shaft 26 to shaft 27.

Housings 35 extend forwardly from the rear of the frame 6 and are open at one side, as best seen in Figure 4, said housings having a series of sprocket wheels 36, 37, 38 positioned therein on which is mounted a sprocket chain 39 provided throughout its length with conveyor spurs 40. It will be noted from Figure 4 that the inner wall of each of these housings is flared outwardly, thereby forming a throat 41 converging toward the rear of the machine.

A gauge wheel 42 is mounted under and near the front end of each housing 35. Extending from the inner wall of each housing 35 is a bearing 43 in which one end of an auger shaped screw 44 is mounted, the other end of each screw 44 being journalled in a plate 45 at the rear of the frame 6. It will be noted that there are two of these screws 44 for each row of corn and that at the forward ends they are tapered to facilitate the entrance of the corn stalk between them. As will be seen from Figures 2 and 3, the forwards ends of these screws 44 extend downwardly to a point a very short distance above the ground and therefore engage the corn stalk at practically the bottom thereof, whereby I am enabled to pick up stalks even if they are laying on the ground and carry them upwardly by the screws to the snapping rollers 45, which as seen from Figure 5, are immediately below the screws 44, but as will be seen in Figures 3 and 1, these snapping rollers 45 are not as long as the screws 44. Again that part of the screws 44 extending over the snapping rollers 45 breaks the ear of corn off from the stalk as the stalk is drawn down by the snapping rollers. The screws 44 do not grip the stalk and pull it out of the ground, but lift the fallen stalk and guide these and the other stalks to the snapping rolls 45.

The ears of corn which are broken from the stalk by the screws 44, as the stalk is being drawn downwardly by the snapping rolls 45, fall over onto the husking rolls 47 which are arranged side by side and to one side of the screws 44 and below the same as seen in Figure 5. As the ear of corn falls on the husking rolls the husk of the ear is pulled loose from the ear, and the husking rollers 47 draw the loosened husks down between them and thus remove the husk from the ear and the husked ear of corn slides off the forward ends of the husking rollers and falls upon the underlying conveyor belt 29 by which it is conveyed to the trough 15. The husks are loosened from the ears by means of the husking hooks 48 which are mounted on a reciprocating frame board or plate 49, which frame is pivotally suspended at its upper edge from the crank 50 of the shaft 51 arranged above the center of one of the rolls 47 and on which is keyed the pinion 52. The frame 49 has its lower edge free and arranged in guided engagement with the said roll 47. By this arrangement the hooks 48 overhang the said roll 47 and move in an inclined path to readily strip the husks from the ears.

On the shaft 26 a bevel gear 53 is keyed which in turn meshes with the bevel gear 54 keyed to the shaft 55 which carries one of the snapping rollers 45, this shaft also having keyed thereto a pinion 56 which meshes with the pinion 57, which is keyed to the shaft of one of the screws 44. 58 is a pinion keyed to the shaft of the other snapping roll 45, which pinion meshes with pinion 56. Pinion 59 on the shaft of one of the husking rolls 47 meshes with the pinion 56, and also meshes with pinion 60 on the shaft of the other husking roll 47. An idler pinion 61 transmits power from pinion 60 to the pinion 52 which is keyed on the shaft 51 that operates the husking frame and hooks 49, 48. The pinion (Figure 3) 62 is keyed to the forward end of the shaft of one of the snapping rolls 45, and meshes with the pinion 72 which drives the short screw 44.

A power belt 63 couples the shaft 64 with the shaft 31 (see Fig. 1) on each end of which shaft 64 is keyed a bevel gear 65 which meshes with the bevel gear 66 keyed to the shaft 67 on which is a pulley which operates the toothed belt 39a, said belt running over idlers 68, within the inner hood 35. It will be noted that this belt 39a is not as long as the belt 39 as its function is not needed after the stalks have reached the snapping rolls, the belt 39 being sufficient after that point is reached to assist the screws 44 in propelling the stalks.

A shaft 69 is suitably mounted on the frame of the machine and is provided with a bevel gear 70 at its upper end which meshes with gear 53 on the shaft 26, said shaft 69 having at its lower end a bevel gear 71.

In moving the machine off the field, the operator manipulates the lever 73, thereby through the crank 74, elevating the front end of the machine, and the trough 15 is mounted on a pivot 75 so that it may also be elevated and held in that position by means of a suitable device 76 so that it will not hit the ground when the front end of the machine is elevated.

The shaft 27 is provided with bevel gears 76' which meshes with gear 77 on shaft 78, which is provided with sprocket wheel 38 which drives chain 39.

What I claim is:

1. In a machine of the character described, the combination with a pair of screw corn stalk lifters and conveyors, of a pair of snapping rolls disposed beneath the said screws, a pair of husking rolls disposed at one side and in a lower plane than the said snapping rolls, and husk loosening means disposed above the husking rolls and at the side of the same opposite that on which the snapping rolls are located.

2. In a machine of the character described, the combination with a pair of screw corn stalk lifters and conveyors, of a pair of snapping rolls disposed beneath the said screws, a pair of husking rolls disposed at one side of and in a lower plane than the said screws, and a husk loosening means above said husker rolls and reciprocable with relation thereto.

3. In a machine of the character described, the combination with a pair of screw corn stalk lifters and conveyors, of a pair of snapping rolls disposed beneath the said screws, a pair of husking rolls disposed at one side of and in a lower plane than the said screws, a husk loosening means above said husking rolls mounted to reciprocate at a slight angle from the perpendicular to the plane of the rolls, and means to convey the husked ears from the machine.

4. In a machine of the kind described, the combination with a pair of screw corn stalk lifters and conveyors, one being longer than the other, a pair of snapping rolls disposed below the screws, a pair of husking rolls disposed at one side of and in a lower plane than the snapping rolls and the rear portion of the longer screw, and means to convey the husked ears from the machine, and husk loosening means disposed above the husking rolls and reciprocable with relation thereto.

5. In a machine of the kind described, the combination with a pair of screw corn stalk lifters and conveyors, one screw being longer than the other, a pair of snapping rolls, a pair of husking rolls disposed at one side of and in a lower plane than the snapping rolls and the rear portion of the longer screw, a trough to receive the husked ears of corn, husk loosening means disposed above the husking rolls and reciprocable at an angle from the perpendicular to the plane of the rolls, means to convey the husked ears from the husking rolls to said trough and an endless conveyor in said trough.

6. In a machine of the kind described, the combination with a pair of screw corn lifters and conveyors, one being longer than the other, a pair of snapping rollers, a pair of husking rollers disposed to one side of and in a lower plane than the rear portion of the longer screw, a reciprocating husk loosening frame associated with the said husking rolls and husking hooks on said frame, means to convey the husked ears from the machine.

7. In a corn picking and husking machine, a frame, rear supporting wheels adjacent to but in advance of the rear end of the frame, small gage wheels at the front of the frame, upwardly and rearwardly inclined feed conveyors on the frame extending both forward and rearward beyond the rear supporting wheels, means for tilting the machine on the rear wheels as an axis to raise the front end of the frame above the ground, a vertically movable transverse ear delivery conveyor at the rear end of the frame beyond the wheels, said transverse conveyor being pivotally mounted for movement to an upward position when not in use or to permit of the aforesaid tilting movement of the machine, snapping rolls and husking means disposed for coaction with the rear portions of the inclined feed conveyors, and intermediate conveyors arranged to receive the husked ears from the snapping rolls and husking means and to convey the same to the rear transverse conveyor.

8. In a machine of the character described, the combination with a pair of screw corn lifters and conveyors, of a pair of snapping rollers disposed below the rear portions of said corn lifters and conveyors, a pair of husking rollers disposed at one side of and in a lower plane than said snapping rollers, a reciprocatory husk loosening frame associated with said husking rollers, husking hooks on said frame, and means for conveying the husked ears from the machine.

In testimony whereof I affix my signature.

HENRY F. YORK.